United States Patent [19]

Lecerf

[11] 4,032,624

[45] June 28, 1977

[54] PROCESS FOR PREPARING PURE SILVER CHROMATE FOR ELECTROCHEMICAL CELLS

[75] Inventor: André Lecerf, Pace, France

[73] Assignee: Saft-Societe des Accumulateurs Fixes et de Traction, Romainville, France

[22] Filed: Sept. 15, 1976

[21] Appl. No.: 723,586

Related U.S. Application Data

[63] Continuation of Ser. No. 612,454, Sept. 11, 1975, abandoned, which is a continuation of Ser. No. 397,918, Sept. 17, 1973, abandoned.

[30] Foreign Application Priority Data

Sept. 26, 1972 France .............................. 72.34056

[52] U.S. Cl. .................................................. 423/595
[51] Int. Cl.$^2$ .................................... C01G 37/14
[58] Field of Search .................. 423/595; 204/291; 429/219

[56] References Cited

FOREIGN PATENTS OR APPLICATIONS 2,110,765   6/1972   France

OTHER PUBLICATIONS

Triuedi et al., "Indian Journal of Chemistry," vol. 1, 1963, pp. 137–138.
Mellor, "Comprehensive Treatise on Inorganic & Theoretical Chemistry," vol. 11, pp. 263–264.
Varna et al., "Z. fur Anorganische und Allgemeine Chemie," vol. 275, pp. 257–259.
Gmelin Handbuch der Anorganischen Chemie, vol. B4, System–Nummer 61, 1972, pp. 288–293.

Primary Examiner—Herbert T. Carter
Attorney, Agent, or Firm—Kenyon & Kenyon, Reilly, Carr & Chapin

[57] ABSTRACT

Method for manufacturing pure silver chromate in which a soluble chromate is made to react with a silver salt in a bichromate medium. The bichromate medium stabilizes the pH and makes it possible to operate in a concentrated medium. The pure product obtained may be used more particularly as a positive active substance in an electrochemical generator having a non-aqueous electrolyte, for it enables avoidance of losses in capacity during idle and storage periods of the generator.

15 Claims, No Drawings

PROCESS FOR PREPARING PURE SILVER CHROMATE FOR ELECTROCHEMICAL CELLS

This is a continuation of application Ser. No. 612,454 filed Sept. 11, 1975, which latter in turn is a continuation of application Ser. No. 397,918 filed Sept. 17, 1973 both now abandoned.

RELATED APPLICATIONS

No related applications are co-pending.

BRIEF SUMMARY OF INVENTION

The present invention relates to the preparation of highly pure silver chromate, which is particularly useful as an active material in an electro-chemical generator.

Silver chromate provides a positive active material which is particularly useful for an electrochemical generator having a lithium negative electrode and a non-aqueous electrolyte, especially by virtue of its very low solubility in the electrolyte solvents used in such generators, which are generally cyclic ethers, carboxylic esters, or mixtures of these two materials. Such possibilities have been described in French patent No. 70 39 140 (publication No. 2110705).

It is essential, however, that the silver chromate used be highly pure. In fact, cells have been made with samples of commerically available silver chromate, with impurity levels as low as 0.5%, but they have been found to be subject to very rapid self-discharge, particularly during periods of idleness or storage. The commercially available chromate material thus cannot as a practical matter be used as active material in such generators.

As highly pure silver chromate is not produced on an industrial scale, it is desirable and advantageous that any method for preparing it to be adapted for production on an industrial scale required the least possible investment, equipment, bulk, time of operation and exploitation costs.

One object of the present invention is, therefore, to provide a process for preparing silver chromate which is pure enough to be used as the positive active material in an electrochemical generator with a lithium negative electrode and a non-aqueous electrolyte. Another object of the invention is to provide a method which is suitable for production on an industrial scale.

A known method of preparing silver chromate consists in reacting a soluble chromate, potassium chromate, for example, with silver nitrate in aqueous solution. The silver chromate, which is only very slightly soluble, is precipitated according to the reaction:

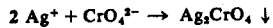

Because the chromate ion $CrO_4^{2-}$ is basic, the resultant product obtained is contaminated with silver oxide and is not suitable for use in electrochemical cells of the type noted herein because the silver oxide contaminant has too high a solubility in the electrolyte solvents used. To avoid the appearance of silver oxide by this known method, it would be necessary to use a very dilute silver nitrate solution, which, is incompatible with a production method capable of use on an industrial scale.

The present invention is based on the discovery that in the presence of a bichromate the pH of the reaction medium remains at such a value that no silver oxide is precipitated; i.e., a pH value of approximately 4.5 is maintained or solutions are contacted such as to avoid increase in pH of above 4.5.

The present invention embraces a novel process for the preparation of highly pure silver chromate that is useful particularly as active material in an electrochemical cell which consists in placing a soluble chromate and a silver salt in an aqueous medium containing a bichromate.

In one manner of practicing the invention, the bichromate used is completely dissolved in the reaction medium. The silver, in the form of a concentrated solution of silver nitrate, for example, and a concentrated chromate solution are then progressively added to the bichromate solution in equivalent quantities, that is to say, at the rate of two $Ag^+$ ions for one chromate ion.

In another manner of carrying out the invention, the bichromate used is silver bichromate and is only partially dissolved in the reaction medium, because of silver bichromate being only slightly soluble in water. A chromate solution is then progressively added. As the solubility of silver chromate is low in relation to that of silver bichromate a double decomposition occurs, as follows:

The reaction medium is preferably heated, to obtain large particles of the precipitate, which are easier to wash and to dry. The medium can be raised to boiling point without disadvantage.

Other objects and features of the invention will become apparent from the following detailed description.

DETAILED DESCRIPTION

The invention will now be described in more detail, with reference to the following illustrative but non-limiting examples.

EXAMPLE 1

As a first step, a solution of magnesium chromate is prepared as follows: 3.35 moles of chromic oxide $CrO_3$ and 2.94 moles of magnesium oxide MgO are introduced into slightly less than one liter of water, which is agitated until the magnesium oxide is completely dissolved. Water is added to obtain a full liter of concentrated solution. This concentrated solution then contains 2.53 moles per liter of magnesium chromate $MgCrO_4$ and 0.41 moles per liter of magnesium bichromate $MgCr_2O_7$. The use of an excess quantity of chromic oxide as compared with the stochiometric amount permits rapid and complete dissolution of the magnesium oxide, and provides a concentrated solution, the magnesium chromate and bichromate contents of which can be calculated from the initial quantities. The presence of magnesium bichromate in the resultant concentrated solution has no effect on the remainder of the process. It would also be possible to use the stoichiometric quantities of chromic oxide and and magnesium oxide in preparing the magnesium chromate and to filter the resultant solution to eliminate the undissolved magnesium oxide. This would provide a concentrated magnesium chromate solution virtually free of bichromate.

The concentrated magnesium chromate solution must be produced as just described as it is not available commercially. The magnesium chromate solution is used as follows for precipitating silver chromate.

Step 2 — 100 cc of a concentrated solution of 0.26M magnesium bichromate is brought to boiling point. This concentrated solution has a pH of 4.5. There are progressively and simultaneously added in equivalent quantities to the solution, as by means of calibrated capillary tubes, 80 cc of the concentrated 2.53 M magnesium chromate solution derived as above described and containing 0.202 moles of chromate, and 112 cc of concentrated silver nitrate solution, containing 0.410 moles of silver. A precipitation of silver chromate occurs. The silver chromate precipitate thus obtained is washed several times in boiling distilled water and then dried for 24 hours at 150° C.

EXAMPLE 2

Step 1 — Silver bichromate is prepared as follows:

A solution of 0.250 moles of sodium bichromate and 0.125 moles of chromic oxide in 200 cc water is brought to boiling point, Then 100 cc of a 5M solution of silver nitrate is added to the boiling solution. As a result, a precipitate of silver bichromate is obtained which is filtered and centrifuged. The weight of the damp silver bichromate precipitate is 108.6 grams.

Step 2 — Then silver chromate is precipitated as follows:

The silver bichromate prepared as above described is placed in suspension in 800 cc of water which is brought to boiling point. Then, 100 cc of the concentrated 2.53M magnesium chromate solution derived as in Example 1 are added gradually thereto. The precipitate of silver chromate resulting is washed several times in boiling distilled water and dried for 24 hours at about 150° C. as in the Example 1. The dry weight of the silver chromate produced is 79.5 grams, representing 0.240 moles of silver chromate.

The method used in Example 2 has an advantage over that of Example 1, in that in Example 1 it is necessary to carefully synchronize the addition of magnesium chromate and silver nitrate to the boiling 0.26 M magnesium bichromate solution to avoid an excess of magnesium chromate that would lead to an increase in the pH and resultant precipitation of contaminating silver oxide. Such synchronization in an industrial process requires complex measures, such as the use of dosing pumps, which are costly and subject to failure. No such requirement exists in the method of the Example 2, which consists of but the two successive steps.

EXAMPLE 3a

An advantageous synthesis of two methods of Examples 1 and 2 can be obtained by modifying the method of the Example 1 as follows: instead of simultaneously adding the concentrated magnesium chromate solution and the concentrated silver nitrate to the boiling concentrated magnesium bichromate solution, all the concentrated silver nitrate solution is first added to the latter solution. It is, therefore, necessary to have available at the start of the process enough magnesium bichromate to precipitate all of the silver nitrate solution into silver bichromate state. This will require a concentrated solution of 0.205 moles of magnesium bichromate, for example, instead of the 0.026 moles thereof used in Example 1. All of the concentrated soluble 2.53M magnesium chromate solution is then added to transform all the precipitated silver bichromate into precipitated silver chromate, as in Example 2. As a result, the limitations of the method of Example 1 and the intermediary operations of the method of Example 2 are avoided.

EXAMPLE 3b

It would also be possible, although this is less advantageous, to carry out alternate additions of concentrated silver nitrate and concentrated magnesium chromate, each addition being limited so as to avoid an increase in the pH, by means of an excess of chromate ions or by exhaustion of bichromate ions.

EXAMPLES 4 to 7

In these Examples, the method of Example 2 was used, except in that instead of using magnesium chromate to precipitate silver chromate from silver bichromate produced as by step 1 of Example 2, the same number of moles of other chromates are substituted in step 2 of Example 2.

Example 4: 100 cc of 2.53 M lithium chromate solution were substituted for magnesium;

Example 5: 100 cc of 2.53 M sodium chromate solution;

Example 6: 100 cc of 2.53 M potassium chromate solution, and

Example 7: 100 cc of 2.53 M ammonium chromate solution.

The following table gives for different samples of silver chromate the silver content by weight determined gravimetrically in terms of silver chloride (AgCl), the content by weight of chromate ions determined volumetrically by means of Mohr's salt, and the sum of these two values.

TABLE

| SAMPLE | Ag% | CrO$_4$% | Ag + CrO$_4$% |
|---|---|---|---|
| Ag$_2$CrO$_4$ (pure) | 65.03 | 34.97 | 100 |
| A | 65.0 | 34.5 | 99.5 |
| B | 61.6 | 33.9 | 95.5 |
| C | 64.88 | 34.93 | 99.81 |
| D | 65.3 | 34.6 | 99.9 |
| E | 65.1 | 34.8 | 99.9 |
| F 1 | 65.15 | 35.0 | 100.15 |
| F 2 | 65.15 | 35.0 | 100.15 |
| G 1 | 65.0 | 35.0 | 100.0 |
| G 2 | 65.2 | 35.0 | 100.2 |

The samples of silver chromate analyzed in this table were as follows:

a. Two commercial samples A and B;

b. Thirteen samples prepared according to the methods of Examples 1 and 2, the mean values of which are given in line C;

c. Two samples D and E prepared according to the methods of Examples 4 and 5 respectively;

d. Two samples F1 and F2 prepared according to the method of Example 6; and e. Two samples G1 and G2 prepared according to the method of Example 7.

Comparing the values obtained for Ag + CrO$_4$ contents of the silver chromate samples, the table shows that the silver chromate samples prepared by methods in accordance with the invention are purer than samples A and B. The few total values in the Table that are slightly above 100% are explained by the degree of precision of the analysis.

The practice of the ivvention enables production of silver chromate whose silver content is between 64.8 and 65.2% (Samples C to G2) preferably between 64.9 and 65.1% (Samples C and E) and of which the chromate ion content is at least equal to 34.6% (Sample D)

and preferably between 34.8 (Sample E) and 35% (Sample F1 to G2). It seems that the presence of ammonium or alkaline cations in the reaction medium may provoke the precipitation of traces of silver oxide. For this reason, it is preferable to introduce only magnesium cations, Example 1, in addition to the silver cations. On the other hand, if silver bichromate is used, Example 2, which has been separated from its original medium the nature of the soluble bichromate used for obtaining it is of no consequence. For this reason sodium bichromate is used in Example 2.

While specific embodiments of the invention have been described, variations in detail within the scope of the appended claims are possible and are contemplated. There is no intention of limitation to the exact disclosure herein made.

What is claimed is:

1. A process of preparing silver chromate of greater than 99.5% purity for use as a positive active material in an electrochemical generator having a lithium negative electrode and a non-aqueous electrolyte comprising reacting concentrated chromate and silver salt solutions in the presence of a concentrated bichromate solution to yield said silver chromate, at least said chromate solution being added progressively into the bichromate solution in such a manner as to maintain the pH thereof at a value which prevents precipitation of silver oxide.

2. A process according to claim 1 in which equivalent quantities of said concentrated silver salt solution and of said concentrated chromate solution are both added progressively to said concentrated bichromate solution, both being added in such a manner as to maintain the pH of said last-named solution at a value which is low enough to prevent precipitation of silver oxide.

3. A process according to claim 1 wherein said chromate solution is of lithium chromate.

4. A process for preparing silver chromate of greater than 99.5% purity for use in a non-aqueous electrolyte type electrochemical generator comprising the steps of reacting concentrated silver salt solution with a concentrated solution of a soluble bichromate and chromic acid to precipitate silver bichromate, placing said silver bichromate precipitate in aqueous suspension and then reacting said precipitate in suspension with a concentrated solution of a soluble chromate selected from the group consisting of magnesium chromate, sodium chromate, potassium chromate, lithium chromate and ammonium chromate, to precipitate silver chromate, said solution of a soluble chromate being gradually added to said precipitate in suspension in such a manner as to maintain the pH thereof at a value not greater than 4.5 to prevent precipitation of silver oxide.

5. A process for preparing silver chromate of greater than 99.5% purity for use as a positive active material in an electrochemical generator having a lithium negative electrode and a non-aqueous electrolyte comprising the steps of heating in the proportions of 100 cc of 0.26M magnesium bichromate solution having a pH of 4.5 to boiling point; then adding 80 cc of a 2.53M magnesium chromate solution containing 0.202 moles of chromate and 122 cc of concentrated silver nitrate solution containing 0.410 grams of silver to the boiling magnesium bichromate solution to precipitate silver chromate of said silver nitrate solution and said magnesium chromate solution, at least said magnesium chromate solution being added progressively into the bichromate solution in such a manner as to avoid increase of said pH above 4.5 to prevent precipitation of silver oxide, washing the precipitated silver chromate and then heating the washed silver chromate to effect drying thereof.

6. A process according to claim 5 wherein said silver nitrate solution and said chromate solution are added simultaneously and progressively to said boiling magnesium bichromate solution in such a manner as to maintain the pH of said last-named solution at a value which avoids increase of said pH above 4.5.

7. A process according to claim 5 wherein said silver nitrate solution is first added to said boiling magnesium bichromate solution and thereafter adding said chromate solution thereto.

8. A process according to claim 5 wherein said silver nitrate solution and said chromate solution are added alternatively to said boiling magnesium bichromate solution, each addition being limited to avoid increase in pH of the magnesium bichromate solution above 4.5.

9. In the process for preparing silver chromate of greater than 99.5% purity for use in an electrochemical cell, the steps comprising preparing a solution of a bichromate and chromic oxide, adding a silver salt to said solution to yield silver bichromate as precipitate, then placing said silver bichromate in suspension in water and then adding a concentrated soluble chromate to the suspension of silver bichromate to yield silver chromate as precipitate.

10. In the process according to claim 9, wherein said suspension in water is elevated to boiling point.

11. In a process for preparing silver chromate of greater than 99.5% purity for use in an electrochemical cell, the steps of preparing a concentrated magnesium chromate solution by reacting chromic oxide with magnesium oxide, preparing a solution of a bichromate and chromic oxide, adding a silver salt to said solution to yield silver bichromate as precipitate, then placing said silver bichromate in suspension in water and gradually adding to said suspension said concentrated magnesium chromate solution to yield silver chromate as precipitate.

12. In a process of preparing silver chromate of greater than 99.5% purity for use in an electrochemical cell, the steps of preparing silver bichromate suspension in water, and adding to said suspension a concentrated soluble chromate solution to yield said silver chromate of greater than 99.5% purity as precipitates, said soluble chromate being added gradually into the bichromate suspension in such a manner as to maintain the pH level thereof at a value which is low enough to prevent precipitation of silver oxide.

13. In the process according to claim 12 wherein said suspension in water is elevated to the boiling point.

14. A process for preparing silver chromate of greater than 99.5% purity for use in a non-aqueous electrolyte type electrochemical generator comprising the steps of reacting concentrated silver salt solution with a concentrated solution of a soluble bichromate and chromic acid to provide in situ a suspension of a precipitate of silver bichromate, and then reacting said precipitate in suspension with a concentrated solution of a soluble chromate selected from the group consisting of magnesium chromate, sodium chromate, potassium chromate, lithium chromate and ammonium chromate, to precipitate silver chromate, said solution of soluble chromate being gradually added to said precipitate in suspension in such a manner as to maintain the pH thereof at a value not greater than 4.5 to prevent precipitation of silver oxide.

15. A process according to claim 14 wherein the cation of the soluble bichromate is the same as the cation of the soluble chromate.

* * * * *